(12) United States Patent
Lee (10) Patent No.: US 10,040,366 B2
(45) Date of Patent: Aug. 7, 2018

(54) BATTERY TERMINAL VOLTAGE PREDICTION (71) Applicant: Ford Global Technologies, LLC, Dearborn, MI (US)

(72) Inventor: Tae-Kyung Lee, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 70 days.

(21) Appl. No.: 15/066,038

(22) Filed: Mar. 10, 2016

(65) Prior Publication Data
US 2017/0259685 A1 Sep. 14, 2017

(51) Int. Cl.
H02J 7/00 (2006.01)
B60L 11/18 (2006.01)

(52) U.S. Cl.
CPC ................ B60L 11/1861 (2013.01)

(58) Field of Classification Search
CPC ................................. B60L 11/1861
See application file for complete search history.

(56) References Cited

U.S. PATENT DOCUMENTS

| | | | |
|---|---|---|---|
| 7,109,685 B2 | 9/2006 | Tate, Jr. et al. | |
| 7,646,166 B2 | 1/2010 | Koch et al. | |
| 7,830,119 B2 | 11/2010 | Naik | |
| 8,008,891 B2 | 8/2011 | Yun et al. | |
| 8,099,180 B2 | 1/2012 | Schoch | |
| 8,935,042 B2 | 1/2015 | Li et al. | |
| 8,935,043 B2 | 1/2015 | Li et al. | |
| 9,071,071 B2 | 6/2015 | Greening et al. | |
| 9,091,735 B2 | 7/2015 | Wang et al. | |
| 9,130,248 B2 | 9/2015 | Laskowsky et al. | |
| 9,132,745 B1 | 9/2015 | Lee | |
| 2009/0259420 A1 | 10/2009 | Greening et al. | |
| 2010/0000809 A1 | 1/2010 | Nishi et al. | |
| 2010/0148731 A1 | 6/2010 | Notten et al. | |
| 2012/0301786 A1 | 11/2012 | Takamuku et al. | |
| 2013/0119921 A1* | 5/2013 | Choe ................ | H02J 7/007 320/106 |
| 2013/0249498 A1 | 9/2013 | Yamamoto et al. | |
| 2014/0072862 A1 | 3/2014 | Saito et al. | |
| 2014/0278167 A1 | 9/2014 | Frost et al. | |

(Continued)

OTHER PUBLICATIONS

Di Domenico, Domenico, et al., Lithium-Ion Battery State of Charge Estimation With a Kalman Filter Based on an Electrochemical Model, Conference Paper, DOI:10.1109/cca 2008.4629639, Oct. 2008, 7 pages.

Primary Examiner — Vuthe Siek
(74) Attorney, Agent, or Firm — Brooks Kushman P.C.

(57) ABSTRACT

A vehicle may include a controller programmed to discharge and charge a battery according to battery terminal voltage values predicted for future time instants traversed by a leading edge of a temporal sliding window having a selectable period based on resistance and capacitance parameters representing the battery and a duration of the selectable period. The battery terminal voltage values may be further predicted based on a state of charge of the battery. The resistance parameters may include internal resistance. Some of the resistance and capacitance parameters may define an RC circuit. The battery terminal voltage values may be further predicted based on a voltage drop across the RC circuit.

15 Claims, 4 Drawing Sheets (56) References Cited

U.S. PATENT DOCUMENTS

| | | |
|---|---|---|
| 2014/0333317 A1 | 11/2014 | Frost et al. |
| 2014/0350877 A1 | 11/2014 | Chow et al. |
| 2015/0316618 A1 | 11/2015 | Lou et al. |
| 2015/0371788 A1 | 12/2015 | Okada et al. |
| 2016/0028080 A1 | 1/2016 | Sugiura |
| 2016/0052419 A1 | 2/2016 | Takahashi et al. |
| 2016/0164093 A1 | 6/2016 | Inoue et al. |
| 2016/0233545 A1 | 8/2016 | Chen et al. |
| 2017/0040616 A1 | 2/2017 | Lee et al. |
| 2017/0133676 A1 | 5/2017 | Kodato et al. |
| 2017/0214103 A1 | 7/2017 | Onnerud et al. |
| 2017/0222225 A1 | 8/2017 | Kang et al. |

\* cited by examiner

BATTERY TERMINAL VOLTAGE PREDICTION

TECHNICAL FIELD

The present disclosure relates to battery terminal voltage prediction for vehicles.

BACKGROUND

Hybrid-electric and pure electric vehicles rely on a traction battery to provide power for propulsion. The traction battery typically includes a number of battery cells connected in various configurations. To ensure optimal operation of the vehicle, various properties of the traction battery may be monitored. One useful property is the battery terminal voltage. The battery terminal voltage may be used to determine allowable charging and discharging limits, to provide information to determine the range of battery operation, and to prevent battery excessive operation.

SUMMARY

A vehicle may include a controller programmed to discharge and charge a battery according to battery terminal voltage values predicted for future time instants traversed by a leading edge of a temporal sliding window having a selectable period based on resistance and capacitance parameters representing the battery, and a duration of the selectable period. The battery terminal voltage values may be further predicted based on a state of charge of the battery. The resistance parameters may include internal resistance. Also, some of the resistance and capacitance parameters define an RC circuit. The battery terminal voltage values may be further predicted based on a voltage drop across the RC circuit.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
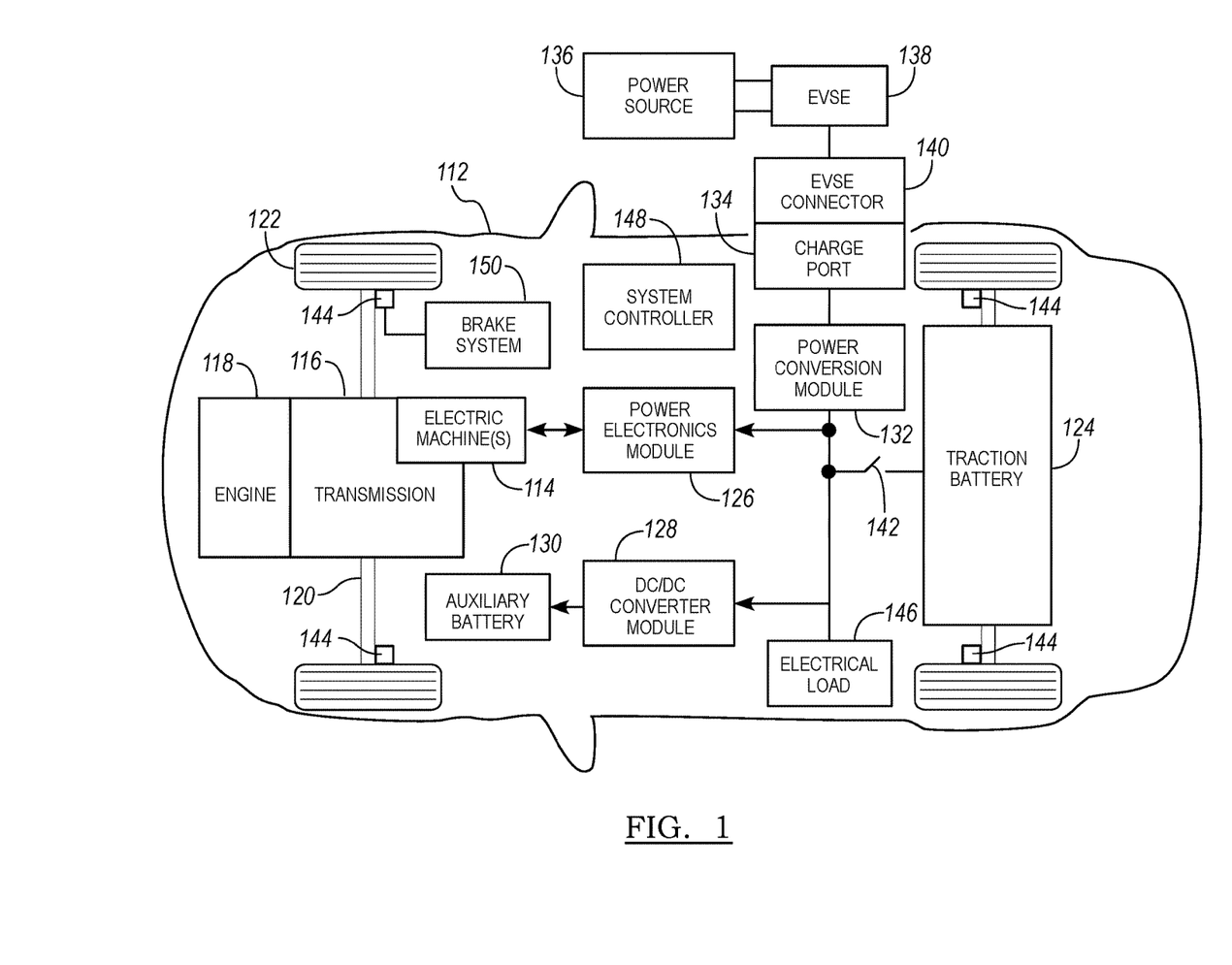
FIG. 1 is a schematic diagram of an electric or hybrid-electric vehicle.

FIG. 1 depicts a typical plug-in hybrid-electric vehicle (HEV). A typical plug-in hybrid-electric vehicle 112 may comprise one or more electric machines 114 coupled to a hybrid transmission 116. The electric machines 114 may be capable of operating as a motor or a generator. In addition, the hybrid transmission 116 is coupled to an engine 118. The hybrid transmission 116 is also coupled to a drive shaft 120 that is coupled to the wheels 122. The electric machines 114 can provide propulsion and deceleration capability when the engine 118 is turned on or off. The electric machines 114 also act as generators and can provide fuel economy benefits by recovering energy that would normally be lost as heat in the friction braking system. The electric machines 114 may also reduce vehicle emissions by allowing the engine 118 to operate at more efficient conditions (engine speeds and loads) and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage DC output. The traction battery 124 is electrically connected to one or more power electronics modules. One or more contactors 142 may isolate the traction battery 124 from other components when opened and connect the traction battery 124 to other components when closed. The power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may use a three-phase AC current to function. The power electronics module 126 may convert the DC voltage to a three-phase AC current used by the electric machines 114. In a regenerative mode, the power electronics module 126 may convert the three-phase AC current from the electric machines 114 acting as generators to the DC voltage used by the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other vehicle loads. Other high-voltage electrical loads 146, such as compressors and electric heaters, may be connected directly to the high-voltage without the use of a DC/DC converter module 128. The electrical loads 146 may have an associated controller that operates the electrical load 146 when appropriate. The low-voltage systems may be electrically connected to an auxiliary battery 130 (e.g., 12V battery).

The vehicle 112 may be an electric vehicle or a plug-in hybrid vehicle in which the traction battery 124 may be recharged by an external power source 136. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 12. The charge port 134 may be any type of port configured to transfer power from the EVSE 138 to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that work cooperatively to operate the wheel brakes 144. For simplicity, the figure depicts one connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 to decelerate or control the vehicle. The brake system 150 may respond to driver commands and may also operate autonomously to implement features such as stability control. The controller of the brake system 150 may implement a method of applying a requested brake force when requested by another controller or sub-function.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components. A traction battery 124 may be constructed from a variety of chemical formulations. Typical battery pack chemistries may be lead acid, nickel-metal hydride (NIMH) or Lithium-Ion.

Figure 2:
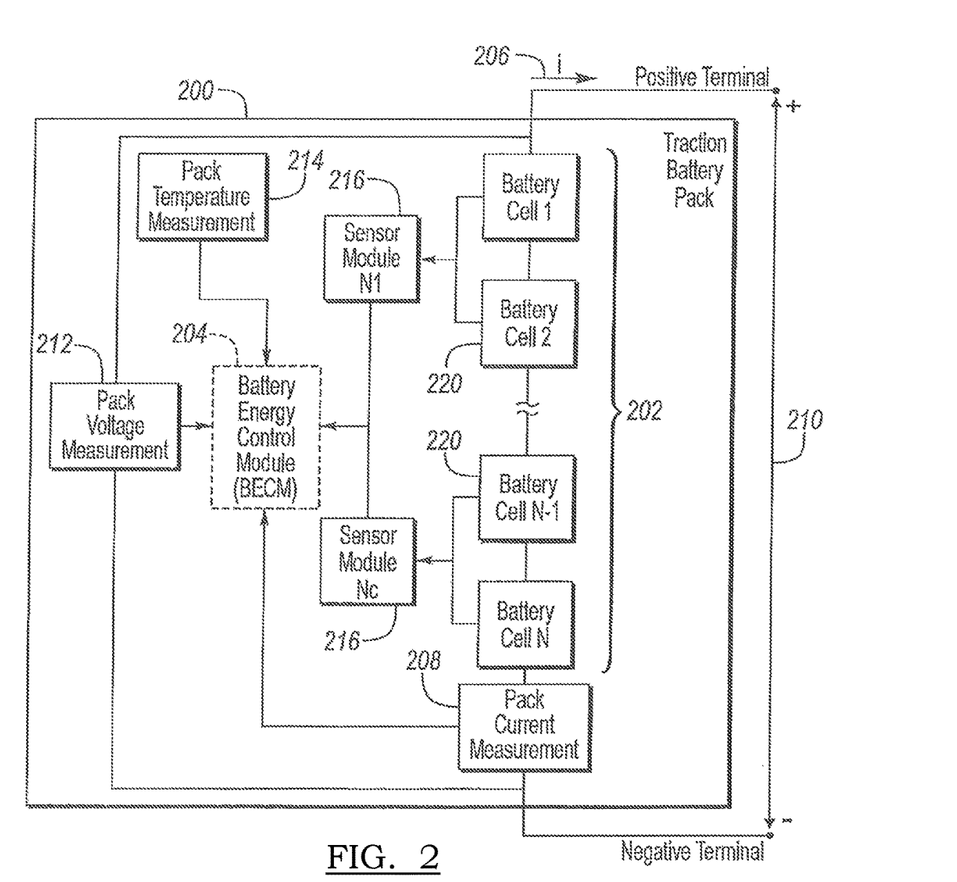
FIG. 2 is a schematic diagram of a vehicle battery system.

FIG. 2 shows a typical traction battery pack 200 in a simple series configuration of N battery cells 202. Battery packs 200, may be composed of any number of individual battery cells connected in series or parallel or some combination thereof. A typical system may have a one or more controllers, such as a Battery Energy Control Module (BECM) 204 that monitors and controls the performance of the traction battery 200. The BECM 204 may monitor several battery pack level characteristics such as pack current 206 that may be monitored by a pack current measurement module 208, pack voltage 210 that may be monitored by a pack voltage measurement module 212 and pack temperature that may be monitored by a pack temperature measurement module 214. The BECM 204 may have non-volatile memory such that data may be retained when the BECM 204 is in an off condition. Retained data may be available upon the next ignition cycle. A battery management system may be comprised of the components other than the battery cells and may include the BECM 204, measurement sensors and modules (208, 212, 214), and sensor modules 216. The function of the battery management system may be to operate the traction battery in a safe and efficient manner.

In addition to the pack level characteristics, there may be battery cell 220 level characteristics that are measured and monitored. For example, the voltage, current, and temperature of each cell 220 may be measured. A system may use a sensor module 216 to measure the characteristics of individual battery cells 220. Depending on the capabilities, the sensor module 216 may measure the characteristics of one or multiple of the battery cells 220. The battery pack 200 may utilize up to $N_c$ sensor modules 216 to measure the characteristics of each of the battery cells 220. Each sensor module 216 may transfer the measurements to the BECM 204 for further processing and coordination. The sensor module 216 may transfer signals in analog or digital form to the BECM 204. In some embodiments, the functionality of the sensor module 216 may be incorporated internally to the BECM 204. That is, the sensor module 216 hardware may be integrated as part of the circuitry in the BECM 204 wherein the BECM 204 may handle the processing of raw signals.

The battery cell 200 and pack voltages 210 may be measured using a circuit in the pack voltage measurement module 212. The voltage sensor circuit within the sensor module 216 and pack voltage measurement circuitry 212 may contain various electrical components to scale and sample the voltage signal. The measurement signals may be routed to inputs of an analog-to-digital (A/D) converter within the sensor module 216, the sensor module 216 and BECM 204 for conversion to a digital value. These components may become shorted or opened causing the voltage to be measured improperly. Additionally, these problems may occur intermittently over time and appear in the measured voltage data. The sensor module 216, pack voltage sensor 212 and BECM 204 may contain circuitry to ascertain the status of the voltage measurement components. In addition, a controller within the sensor module 216 or the BECM 204 may perform signal boundary checks based on expected signal operating levels.

Equivalent Circuit Model and Parameter Estimation

Figure 3:
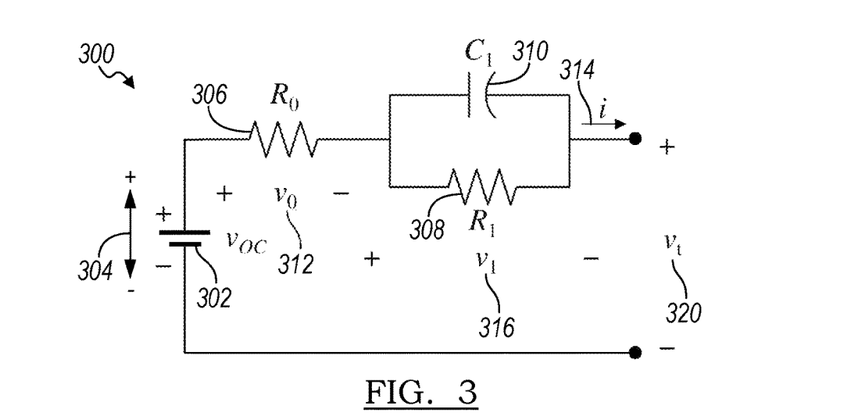
FIG. 3 is a schematic of an equivalent circuit used to model the battery.

A battery cell may be modeled in a variety of ways. For example, a battery cell may be modeled as an equivalent circuit. FIG. 3 shows one possible battery cell equivalent circuit model (ECM) 300, called as a simplified Randles circuit model. A battery cell may be modeled as a voltage source 302 having an open circuit voltage ($V_{oc}$) 304 having an associated impedance. The impedance may be comprised of one or more resistances (306 and 308) and a capacitance 310. The $V_{oc}$ 304 represents the open-circuit voltage (OCV) of the battery expressed as a function of a battery state of charge (SOC) and temperature. The model may include an internal resistance, $R_0$ 306, a charge transfer resistance, $R_1$ 308, and a double layer capacitance, $C_1$ 310. The voltage $V_0$ 312 is the voltage drop across the internal resistance 306 due to current 314 flowing from the voltage source 302. The voltage $V_1$ 316 is the voltage drop across the parallel combination of $R_1$ 308 and $C_1$ 310 due to current 314 flowing through the parallel combination. The voltage $V_t$ 320 is the voltage across the terminals of the battery (terminal voltage). The parameter values, $R_0$, $R_1$, and $C_1$ may be known or unknown. The value of the parameters may depend on the cell design and the battery chemistry.

Because of the battery cell impedance, the terminal voltage, $V_t$ 320, may not be the same as the open-circuit voltage, $V_{oc}$ 304. As typically only the terminal voltage 320 of the battery cell is accessible for measurement, the open-circuit voltage, $V_{oc}$ 304, may not be readily measurable. When no current 314 is flowing for a sufficiently long period of time, the terminal voltage 320 may be the same as the open-circuit voltage 304, however typically a sufficiently long period of time may be needed to allow the internal dynamics of the battery to reach a steady state. Often, current 314 is flowing in which $V_{oc}$ 304 may not be readily measurable and the value inferred based on the equivalent circuit model 300 may have errors by not capture both fast and slow dynamic properties of the battery. The dynamic properties or dynamics are characterized by a frequency response, which is the quantitative measure of the output spectrum of a system or device (battery, cell, electrode or sub-component) in response to a stimulus (change in current, current profile, or other historical data on battery current). The frequency response may be decomposed into frequency components such as fast responses to a given input and slow responses to the given input. The relative term fast responses and slow responses can be used to describe response times less than a predetermined time (fast) or greater than a predetermined time (slow). To improve battery performance, a model that captures both fast and slow battery cell dynamics is needed. Current battery cell models are complex and are not practical for modern electronic control systems. Here a reduced order battery cell model that is reduced in complexity such that it may be executed on a microcontroller, microprocessor, ASIC, or other control system and captures both fast and slow dynamics of the battery cell is disclosed to increase the performance of the battery system.

The HEV battery management system may implement the Randles Circuit Model using an Extended Kalman Filter to estimate the battery parameters. The battery parameters may include, but are not limited to, battery resistance, capacitance, and/or other state(s) of a battery model. The estimated battery parameters may include fluctuating trajectories which increase when the vehicle is in certain system modes including battery charging, battery sustaining charge, or battery depleting charge. These battery parameters tend to be sensitive to internal and external noise and environmental conditions when using a Randles circuit to estimate these parameters.

A system may eliminate fluctuating trajectories of the one or more battery parameters by using a dynamic model which relates the model resistance parameters together and sets the system time constant as an independent variable for the system identification. The system observability is a measure of how well internal states can be inferred by only using external system outputs. The observability, however, may be improved and the estimated parameter(s) may be less sensitive to the noise(s) with the use of a dynamic model.

A battery management system and method may be based on a Randles Circuit Model to provide improved observability of the system and subsequent robustness in a battery parameter estimation method without increasing the system complexity. The equivalent circuit model 300 may allow the calculation of predictive battery system parameters. A portion of the Randles Circuit Model is represented by the following equation:

$$\dot{v}_1 = -\frac{1}{R_1 C_1} v_1 + \frac{1}{C_1} i \quad (1)$$

where $v_1$ 316 is the voltage of the R-C circuit, which consists of $R_1$ 308 and $C_1$ 310 as a function of time, $i$ 314 is the current exciting the circuit, and $R_1$ 308 and $C_1$ 310 represent battery dynamics changing during vehicle operation 2. The equivalent circuit model may allow the calculation of the battery terminal voltage using the following equation:

$$v_t = v_{OC} - v_1 - R_0 i \quad (2)$$

where $v_t$ 320 is the terminal voltage, $v_{OC}$ 302 is the battery open circuit voltage, and $R_0$ 306 is the internal battery resistance. The battery system dynamic control used to calculate/predict/estimate battery parameters may include a function of material properties form the electrochemical battery models. Therefore, each parameter may be related with the relations shown in the following equations:

$$\tau_1 = R_1 C_1 = k_1 R_0 C_1 \quad (3)$$

$$R_1 = k_1 R_0 \quad (4)$$

where $k_1$ is the introduced parameter identified in real-time during vehicle operation and $\tau_1$ is the dynamic respondent of the circuit in real-time. The parameter $k_1$ is a quotient of the internal resistance $R_0$ and a resistance term of the charge transfer impedance $R_1$. The parameter $\tau_1$ is a time constant associated with the charge transfer impedance to reduce observed variability of the parameters. Based on equations (3) and (4), the following equation is derived from equation (1):

$$\dot{v}_1 = -\frac{1}{\tau_1} v_1 + \frac{k_1 R_0}{\tau_1} i \quad (5a)$$

where $v_1$ 316 is the voltage across the R-C circuit as a function of time at time index $k_1$ representing a dynamic respondent of the circuit. Therefore, the following variables are set at time index k:

$$\dot{v}_1 = \frac{v_{1,k+1} - v_{1,k}}{\Delta t} \quad (5b)$$

$$v_1 = v_{1,k}, \text{ and} \quad (5c)$$

$$i = i_k \quad (5d)$$

Having the variables set at a time index enables equation (5a) to be rearranged as follows:

$$v_{1,k+1} = \left(1 - \frac{\Delta t}{\tau_1}\right) v_{1,k} + \frac{k_1 R_0 \Delta t}{\tau_1} i_k \quad (6)$$

$$y_k = v_{OC,k} - v_{t,k} - R_0 i_k = v_{1,k} \quad (7)$$

where $y_k$ is the voltage across the R-C circuit. The model parameter $R_0$ and introduced model parameters $k_1$ and $\tau_1$ augment the state variable $v_1$ 316. Therefore, an augmented state vector is shown in the following equation:

$$X = [v_1 R_0 k_1 \tau_1]^T \quad (8)$$

The augmented state vector is not limited to the parameters of battery dynamic response $v_1$ and other model parameters characterizing battery dynamics $R_0$, $k_1$, and $\tau_1$ disclosed in equation (8). For example, if an equivalent circuit model includes additional R-C circuits and/or the battery model has other forms of battery dynamic representation, the one or more augmented state vector parameters may change.

A new expression of equation (8) using the augmented state vector X is show in the following Jacobian matrix equation:

$$\begin{bmatrix} v_{1,k+1} \\ R_{0,k+1} \\ k_{1,k+1} \\ \tau_{1,k+1} \end{bmatrix} = F_k \begin{bmatrix} v_{1,k} \\ R_{0,k} \\ k_{1,k} \\ \tau_{1,k} \end{bmatrix} + \begin{bmatrix} \frac{k_1 R_0}{\tau_1} \\ 0 \\ 0 \\ 0 \end{bmatrix} i_k \qquad (9a)$$

where $F_k$ is the system matrix to describe system dynamics and model parameter changes.

A new expression of equation (7) using the augmented state vector X is shown in the following equation:

$$y_k = H_k \begin{bmatrix} v_{1,k} \\ R_{0,k} \\ k_{1,k} \\ \tau_{1,k} \end{bmatrix} \qquad (9b)$$

where $H_k$ is the output matrix for calculating a system response. For example, this output matrix may calculate the battery terminal voltage $v_t$ as the estimated system response in real-time. The system matrix $F_k$ and the output matrix $H_k$ are expressed in the following equations:

$$F_k = \begin{bmatrix} 1 - \frac{\Delta t}{\tau_1} & \frac{k_1 \Delta t}{\tau_1} i_k & \frac{R_0 \Delta t}{\tau_1} i_k & \frac{\Delta t}{\tau_1^2}(v_{1,k} - k_1 R_0 i_k) \\ 0 & 1 & 0 & 0 \\ 0 & 0 & 1 & 0 \\ 0 & 0 & 0 & 1 \end{bmatrix} \qquad (10a)$$

$$H_k = [1 \ \ i_k \ \ 0 \ \ 0] \qquad (10b)$$

The model parameters are used to predict the voltage response when a constant current (i) is applied during time (t) as shown in the following equations:

$$v_1 = v_{1,0} e^{-\frac{1}{R_1 C_1} t} + \left(1 - e^{-\frac{1}{R_1 C_1} t}\right) R_1 i \qquad (11)$$

$$v_t = v_{OC} - v_{1,0} e^{-\frac{1}{R_1 C_1} t} - \left(R_0 + \left(1 - e^{-\frac{1}{R_1 C_1} t}\right) R_1\right) i \qquad (12)$$

Battery current limits may be computed by the following equation:

$$i_{lim} = \frac{v_{OC} - v_{lim} - v_{1,0} e^{-\frac{1}{R_1 C_1} t_d}}{R_0 + R_1 \left(1 - e^{-\frac{1}{R_1 C_1} t_d}\right)} \qquad (13)$$

Battery power capability $P_{cap}$ may be computed by the following equation:

$$P_{cap} = |i_{lim}| v_{lim} \qquad (14)$$

where $v_{lim}$ in equation (13) and equation (14) is the lower limit voltage of the battery terminal voltage under discharging, and $v_{lim}$ in equation (13) and equation (14) is the upper limit voltage of the battery terminal voltage under charging. For example, during a battery discharge event, the battery discharge current limit during the time period $\Delta t_d$ is calculated from equation (13). Using the calculated battery discharge current limit from equation (13), the battery available power is calculated from equation (14) for the discharge event.

The improved battery parameter calculation method allows for an enhanced estimation of the battery power capability while enabling the reduction of a safety margin for a battery usage so that the battery hardware may be applied more aggressively in the powertrain system. Based on the improved method, the HEV controls become more flexible, thus resulting in improved powertrain performance and efficiency.

Figure 4:
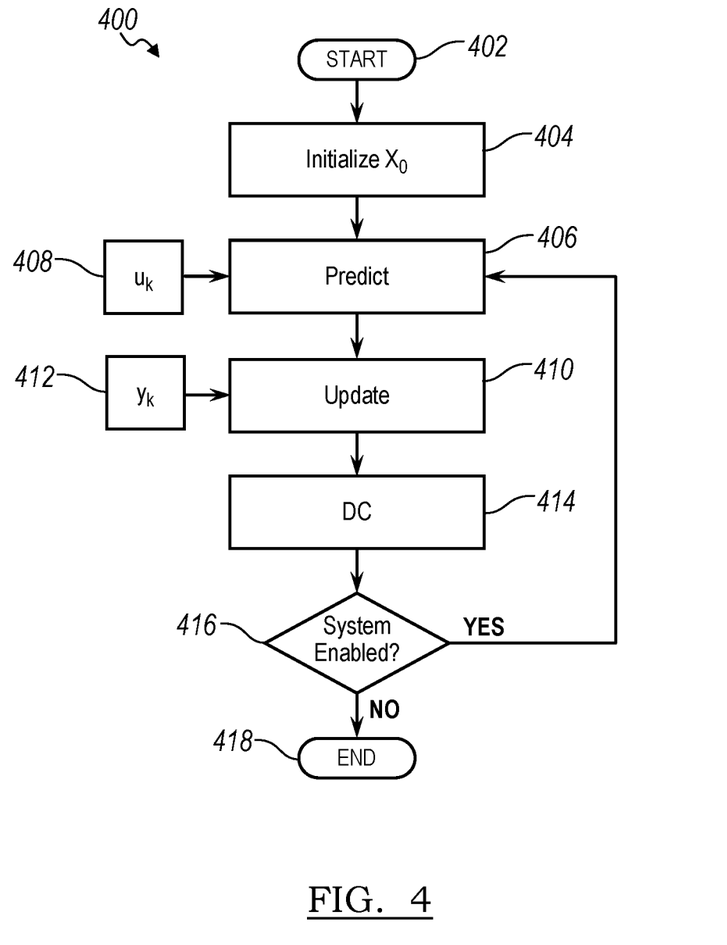
FIG. 4 is a flow chart for determining parameters associated with the battery model.

FIG. 4 is a flow chart of an algorithm for identifying one or more battery model parameters used in a battery management method. The method may be implemented using software code contained within the vehicle control module. In other embodiments, the method 400 may be implemented in other vehicle controllers, or distributed amongst multiple vehicle controllers.

Referring again to FIG. 4, the vehicle and its components illustrated in FIG. 1 and FIG. 2 are referenced throughout the discussion of the method to facilitate understanding of various aspects of the present disclosure. The method of controlling the battery parameter prediction in the hybrid electric vehicle may be implemented through a computer algorithm, machine executable code, or software instructions programmed into a suitable programmable logic device(s) of the vehicle, such as the vehicle control module, the hybrid control module, other controller in communication with the vehicle computing system, or a combination thereof. Although the various steps shown in the flowchart diagram 400 appear to occur in a chronological sequence, at least some of the steps may occur in a different order, and some steps may be performed concurrently or not at all.

At step 402, during a key-on event which allows the vehicle to be powered on, the vehicle computing system may begin powering up the one or more modules. The powering up of the one or more modules may cause variables related to the battery management system to initialize before enabling one or more algorithms to be executed within the vehicle computing system at step 404.

For example, the battery parameters may need to be initialized during a key-on event due to the dynamics of a battery cell at rest having a self-discharge/charge depletion state. The battery management method may initialize the augmented state vector before predicting and updating the battery terminal voltage, current limits, and/or other battery related parameters to ensure system observability and estimation robustness after the battery pack experiences a charge depletion state. The battery charge depletion state may vary based on several factors including length of vehicle power down without charge, life of the battery, and/or environmental conditions.

At step 406, once the battery management system has initialized the one or more parameters, the system may predict the battery power capability. Predicting the battery power capability allows the system to determine how much power the vehicle computing system may distract from the battery at that moment. Using an accurate predicting algorithm improves the life of the battery, performance of the powertrain system, and the performance of other systems/subsystem powered by the battery pack in the battery electric and/or hybrid electric vehicle.

The predicting equation for the battery management system may include the Extended Kalman Filter with the use of the introduced parameters as presented in the equations above. The model based equation is as follows:

$$\hat{x}_{k|k-1} = f(\hat{x}_{k-1|k-1}, u_{k-1}) \quad (15)$$

where $\hat{x}_{k-1|k-1}$ is the augmented state vector, $u_{k-1}$ is the input current, and f is a nonlinear function representing system dynamics.

At step 408, the input current $u_k$ is transmitted to the algorithm at the specific operating point to allow the system to predict the battery parameters at that time variant. The model parameters are used to predict the voltage response when a constant current is applied during a time period. Based on the equations above, and Extend Kalman Filter (EKF) known variables, the updated filter equation may now predict the next state of the battery power capabilities using the equations as follows:

$$F_{k-1} = \frac{\partial f}{\partial x}\bigg|_{\hat{x}_{k-1|k-1}, u_{k-1}} \quad (16a)$$

$$P_{k|k} = \text{cov}(x_k - \hat{x}_{k|k}) = E\big((x_k - \hat{x}_{k|k})(x_k - \hat{x}_{k|k})^T\big) \quad (16b)$$

$$P_{k|k-1} = \text{cov}(x_k - \hat{x}_{k|k-1}) = E\big((x_k - \hat{x}_{k|k-1})(x_k - \hat{x}_{k|k-1})^T\big) \quad (16c)$$

$$P_{k|k-1} = F_{k-1} P_{k-1|k-1} F_{k-1}^T + Q_k \quad (17)$$

where (16a) is a Jacobian matrix derived from the function of f, k−1 is the time at which the Jacobian matrix is computed, P is a covariance matrix of the state estimation error, and $F_{k-1}$ includes the new parameters that have a physical relationship between the battery parameters and the system dynamics.

At step 410, after the battery management system has predicted the battery power capability, the system may update the battery management system with the new battery measurement value. The new measurement value is based on the predicted battery power capability and the following equation:

$$\tilde{y}_k = y_k - h(\hat{x}_{k|k-1}) \quad (18)$$

where $h(\hat{x}_{k|k-1})$ is the estimation of the measurement in the step 410. The $y_k$ measurement of the battery system is received and transmitted for use in the updating of the new battery measurement predicted value at step 412.

The following equation is the intermediate to determine the Kalman gain $K_k$:

$$S_k = H_k P_{k|k-1} H_k^T + R_k \quad (19)$$

The equation used to determine the Kalman gain $K_k$ is as follows:

$$K_k = P_{k|k-1} H_k S_k^{-1} \quad (20)$$

where the Kalman gain determines update state vector $\hat{x}_{k|k}$ from the $K_k \tilde{y}$ as follows:

$$\hat{x}_{k|k} = \hat{x}_{k|k-1} + K_k \tilde{y}_k \quad (21)$$

The covariance of a state estimation error is in the following equation:

$$P_{k|k} = (I - K_k H_k) P_{k|k-1} \quad (22)$$

At step 414, the system may receive the augmented state vector of the battery pack and/or cell based on the predicted and updated Kalman equations, and may compute the voltage response of the battery model. The augmented state vector is partially defined by a variable representing proportionality between the internal resistance and a resistance term of the charge transfer impedance. If the battery management system is enabled, for example the vehicle is still in a key-on state, then the system may continue to use the updated Kalman filter with the introduced variables to predict and update the power capabilities of the battery in real-time at step 416.

At step 418, if the system detects a key-off event which may disable power to the vehicle computing system, the system may end the one or more algorithms used to manage the battery pack and/or the one or more battery cells. The vehicle computing system may have a vehicle key-off mode to allow the system to store one or more parameters in nonvolatile memory such that these parameters may be used by the system for the next key-on event.

An accurate battery parameter estimation method for the battery management system provides performance, reliability, density in design of battery packs/cells, and/or economy by having smaller battery systems. The accurate battery parameter estimation method may include an adjusted state vector in the EKF method that improves battery control related to operating conditions including, but not limited to, state of charge, power fade, capacity fade, and instantaneous available power. The estimation method of battery parameters may ultimately lengthen the useful lifetime of the battery system.

Terminal Voltage Estimation

The terminal voltage of the battery may be estimated for a given constant power demand for the predetermined period. The vehicle battery may be charged and discharged according to the battery terminal voltage. Equation (13), as restated in Equation (23), provides a battery current limit.

$$i = \frac{v_{OC} - v_{lim} - v_{1,0} e^{-\frac{1}{R_1 C_1} t_d}}{R_0 + R_1 \left(1 - e^{-\frac{1}{R_1 C_1} t_d}\right)} \quad (23)$$

where parameters $R_0$, $R_1$, $v_1$, $C_1$, may be estimated from the above method, and the $v_{oc}$ may be determined from a state of charge. The state of charge may be derived from a Coulomb counting or other method.

$v_{lim}$ of equation (23) is a representative voltage limit at the terminals of the batteries. Power demand, P, an arbitrary input value, is equal to the product of battery terminal voltage, $v_t$, and battery current, i, as shown in Equation (24).

$$P = v_t i \quad (24)$$

A relationship may be established relating Equations (23) and (24). Using Equations (25) and (26) and setting $v_{lim}$ to $v_t$, representative equations for α and β are determined.

$$\alpha = \frac{1}{R_0 + R_1 \left(1 - e^{-\frac{1}{R_1 C_1} t_d}\right)} \quad (25)$$

$$\beta = \frac{v_{OC} - v_{1,0} e^{-\frac{1}{R_1 C_1} t_d}}{R_0 + R_1 \left(1 - e^{-\frac{1}{R_1 C_1} t_d}\right)} \quad (26)$$

Substituting equations α and β for i in Equation (24) yields Equation (27).

$$P = v_t(-\alpha v_t + \beta) \qquad (27)$$

where solving for $v_t$ allows develops a relationship between power demand, P, and terminal voltage, $v_t$, in Equation (28).

$$v_t = \frac{\beta + \sqrt{\beta^2 - 4\alpha P}}{2\alpha} \qquad (28)$$

Equation (28) predicts future terminal voltage of the battery for an arbitrary power demand level. The prediction interval may be set based on numerous inputs. For instance, the vehicle mode may determine the prediction interval. A hybrid vehicle mode may warrant terminal voltage prediction for one second in the future. Electric-only vehicle modes may warrant terminal voltage prediction for ten seconds in the future. As another example, battery state of charge may also influence the prediction time. $v_t$ may be predicted by the leading edge of a temporal sliding window for a given period based on parameters of the equivalent circuit as discussed above. The leading edge of the temporal sliding window may be set at one second with calculations being performed for the entire temporal sliding window to indicate a predicted terminal voltage.

Figure 5A:
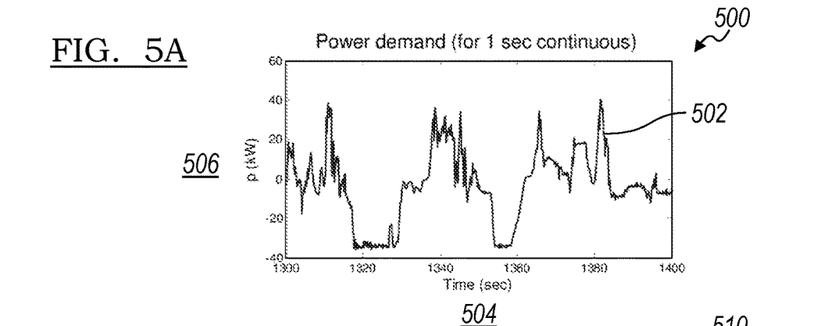
FIG. 5A is a graph depicting power demand.
Figure 5B:
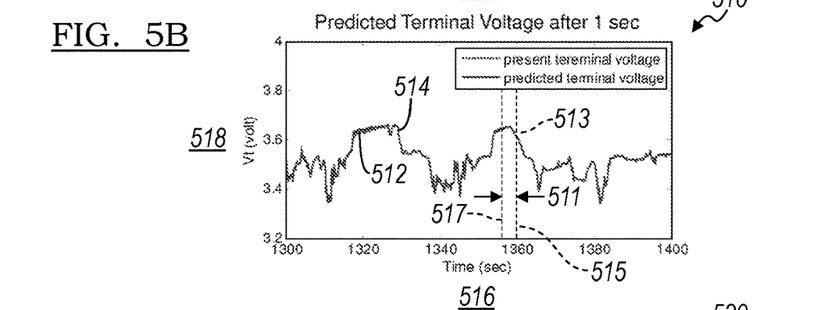
FIG. 5B is a graph depicting a one second estimation window associated with predicting terminal voltage of the battery.

Now referring to FIG. 5A, a graph 500 indicating a power demand 502 input value or command is received by the controller. The power demand 502 is shown on the y-axis 506 in kilowatts over time of the x-axis 504 in seconds. The power demand may be positive or negative, indicating charging or discharging of the battery. FIG. 5A is associated with FIG. 5B. FIG. 5B includes a graph 510 indicating the predicted terminal voltage one second in advance using the techniques described above. The present terminal voltage 512 is shown on the y-axis 518 in volts over time of the x-axis 516 in seconds. The predicted terminal voltage is shown using methods indicated above. The leading edge 513 of a one second temporal sliding window 511 at a present terminal voltage 512 is shown. The temporal sliding window 511 moves over time to predict terminal voltage values 514 from a leading edge 513. As time progresses, the temporal sliding window 511 continues to advance giving predicted terminal voltage values 514. For example, a present terminal voltage 512 taken at time 517 may result in a temporal sliding window 511 having a leading edge 513 at time 515. As indicated in FIG. 5B, the temporal sliding window 511 may have a span of one second.

Figure 5C:
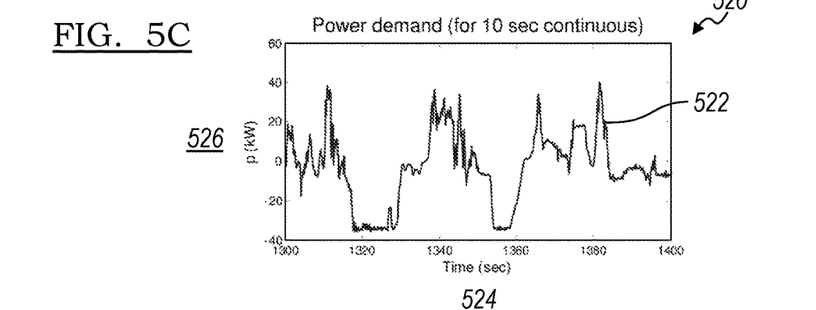
FIG. 5C is a graph depicting power demand.
Figure 5D:
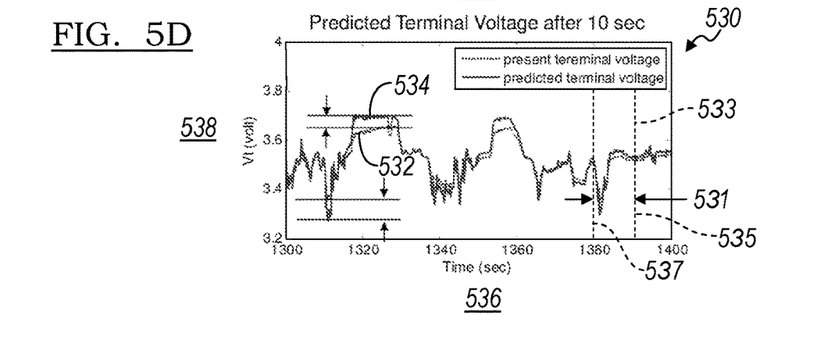
FIG. 5D is a graph depicting a ten second estimation window associated with predicting terminal voltage of the battery.

Now referring to FIG. 5C, a graph 520 indicating a power demand 522 input value or command is received by the controller. The power demand 522 is shown on the y-axis 526 in kilowatts over time of the x-axis 524 in seconds. The power demand may be positive or negative, indicating charging or discharging of the battery. FIG. 5C is associated with FIG. 5D. FIG. 5D includes a graph 530 indicating the predicted terminal voltage ten seconds in advance using the techniques described above. The present terminal voltage 532 is shown on the y-axis 538 in volts over time of the x-axis 536 in seconds. The predicted terminal voltage is shown using methods indicated above. The leading edge 533 of a ten seconds temporal sliding window 531 at a present terminal voltage 532 is shown. The temporal sliding window 531 moves over time to predict terminal voltage values 534 from a leading edge 533. As time progresses, the temporal sliding window 531 continues to advance giving predicted terminal voltage values 534. For example, a present terminal voltage 532 taken at time 537 may result in a temporal sliding window 531 having a leading edge 533 at time 535. As indicated in FIG. 5D, the temporal sliding window 531 may have a span of ten seconds.

As shown in FIGS. 5A-D, the sliding window may have different lengths. The sliding window may be static or adjusted dynamically. The dynamic adjustment of the sliding window may be determined by different operating modes of the vehicle. For instance a hybrid electric vehicle may have different temporal sliding windows depending on an electric-only or hybrid mode.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a battery; and
    a controller programmed to discharge and charge the battery according to battery terminal voltage values predicted for future time instants traversed by a leading edge of a temporal sliding window having a selectable period based on resistance and capacitance parameters representing the battery and a duration of the selectable period.

2. The vehicle of claim 1, wherein the battery terminal voltage values are further predicted based on a state of charge of the battery.

3. The vehicle of claim 1, wherein the resistance parameters include internal resistance.

4. The vehicle of claim 1, wherein some of the resistance and capacitance parameters define an RC circuit.

5. The vehicle of claim 4, wherein the battery terminal voltage values are further predicted based on a voltage drop across the RC circuit.

6. A method comprising:
    discharging and charging by a controller a battery of a vehicle according to battery terminal voltage values predicted for future time instants traversed by a leading edge of a temporal sliding window having a selectable period based on resistance and capacitance parameters representing the battery and a duration of the selectable period.

7. The method of claim 6, wherein the battery terminal voltage values are further predicted based on a state of charge of the battery.

8. The method of claim 6, wherein the resistance parameters include internal resistance.

9. The method of claim 6, wherein some of the resistance and capacitance parameters define an RC circuit.

10. The method of claim 9, wherein the battery terminal voltage values are further predicted based on a voltage drop across the RC circuit.

11. A controller comprising:
input channels configured to receive a power demand from a vehicle network;
output channels configured to provide to the vehicle network predicted battery terminal voltage values; and
control logic programmed to generate the predicted battery terminal voltage values for future time instants traversed by a leading edge of a temporal sliding window having a selectable period based on resistance and capacitance parameters representing the battery and a duration of the selectable period.

12. The controller of claim 11, wherein the control logic is further programmed to predict the battery terminal voltage values based on a state of charge of the battery.

13. The controller of claim 11, wherein the resistance parameters include internal resistance.

14. The controller of claim 11, wherein some of the resistance and capacitance parameters define an RC circuit.

15. The controller of claim 14, wherein the control logic is further programmed to predict the battery terminal voltage values based on a voltage drop across the RC circuit.

* * * * *